United States Patent [19]

Tarumi et al.

[11] 4,426,654

[45] Jan. 17, 1984

[54] ION MODULATING ELECTRODE

[75] Inventors: Noriyoshi Tarumi, Hachioji; Haruo Iwahashi, Fussa; Masahiko Matsunawa; Hiroshi Tokunaga, both of Hachioji, all of Japan

[73] Assignee: Konishiroku Photo Industry Co., Ltd., Tokyo, Japan

[21] Appl. No.: 290,393

[22] Filed: Aug. 5, 1981

[30] Foreign Application Priority Data

Aug. 15, 1980 [JP] Japan ................................ 55-112839

[51] Int. Cl.³ .............................................. G01D 15/06

[52] U.S. Cl. .................................... 346/159; 250/326; 250/426; 361/229; 361/230

[58] Field of Search ................ 346/155, 159; 313/207, 313/217, 219-221; 315/111.8-111.9; 250/326, 426; 361/229, 230

[56] References Cited

U.S. PATENT DOCUMENTS 4,155,093 5/1979 Fotland et al. ....................... 346/159

4,160,257 7/1979 Carrish ................................ 346/159

OTHER PUBLICATIONS

"Indirect Discharge Recording", Kimura et al., Industry Applications Society IEEE-IAS Annual Meeting, Sep. 30, 1979, pp. 30-33.

*Primary Examiner*—Thomas H. Tarcza

*Attorney, Agent, or Firm*—Jordan B. Bierman; Linda Bierman

[57] ABSTRACT

An ion modulating electrode to form an electrostatic image on the image recording member by modulating the ion flow includes a multi-layer structure consisting of a first conductive layer and a first dielectric layer, a second conductive layer, and a second dielectric layer and a third conductive layer, stacked together in that order to form a multi-layer structure, through-apertures formed in this multi-layer structure, and a dielectric or semiconductive thin film coated on the first conductive layer or third conductive layer. A high-frequency voltage is applied between the first conductive layer and the second conductive layer to produce ions in these apertures. A voltage is applied to the third conductive layer for enhancing the passage through the apertures of ions generated in these apertures by high frequency voltage. The thin film covers a part of the inside of the apertures.

6 Claims, 2 Drawing Figures

ION MODULATING ELECTRODE

BACKGROUND OF THE INVENTION

1. Field of the Invention

This invention relates to a novel ion modulating electrode which forms an electrostatic image on a charge receptor by modulating the ion flow.

2. Description of the Prior Art

There are two methods of electrostatic recording that have been practiced conventionally. One is a direct discharge recording in which multi-stylus electrodes are used and a direct discharge takes place between the dielectric charge receptor surface and the electrode. The other is an indirect discharge recording in which a discharge is made to take place at a point remote from the charge receptor surface and the generated ions are used for forming the latent image.

The direct discharge recording method has disadvantages in that the charge receptor surface is liable to damage due to contact with the multi-stylus electrode and in that the distance between the multi-stylus electrode and the charge receptor surface should be kept to a required amount with high precision.

On the other hand, the indirect discharge recording method makes it possible to expand greatly the distance between the multi-stylus electrode and the charge receptor surface because a stable discharging can be performed at a point distant from the charge receptor surface to produce ions which will be attached to the charge receptor surface. Thus with this method the accuracy of the distance is allowed to be not so severe as in direct discharge recording, making it easy to handle the device of this method. Therefore, various kinds of recording electrodes have been proposed for use with the device of this method.

A Japanese Patent Laid-Open Application No. 3533/1979 proposes a latent image forming electrode which is improved on the problems experienced with conventional recording electrodes, such as difficulty in manufacturing the electrode, clogging of apertures and difficulty in controlling the dot diameter expansion.

The latent image forming electrode of the above patent application consists of two conductors for producing ions by discharge with a dielectric member bonded between the two conductors and a third conductor for ion-modulating with a dielectric member bonded between the third conductor and one of the above two conductors thus forming a multi-layer structure. This multi-layer electrode has through-apertures.

With this electrode, a pulse voltage is applied between the two conductors, which are exposed at the inner wall of the through-apertures, to cause a discharge between the electrodes to produce ions. The flow of ions to the charge receptor surface is controlled by applying a pulse voltage to the control electrode. It was reported that the above construction greatly improved the recording speed enabling high-speed recording.

The above electrode, however, has disadvantages in that a large amount of current flows to the electrode because the electrode is exposed and in that since high energy electrons and positive and negative ions are generated near the electrode, the electrode is liable to be corroded, shortening its life and deteriorating the efficiency of ion generation.

Other type of electrode is proposed in the U.S. Pat. Nos. 4,155,093 and 4,160,257. The American patented electrode is described in the following referring to FIG. 1.

In the figure, reference numerals 1 and 2 denote electrodes between which a dielectric 4 is disposed. AC voltage from an AC power source 8 is applied between the two electrodes. A voltage from a power source 10 is applied between a backing electrode 7 of a recording member 6 and a modulating electrode 3 which is bonded to the electrode 2 with a dielectric 5 held therebetween. Also a voltage from a power source 9 is applied between the backing electrode 7 and the electrode 2. The application of voltage between the electrodes 1 and 2 causes a spark discharge producing ions, of which only positive or negative ions are accelerated toward the recording member 6.

This electrode has an advantage that since the spark discharge occurs between the electrodes through the dielectric 4, the damage to the electrodes caused by discharge is very small. There are, however, various problems that have to be solved before it can be put to practical use. For example, apertures are liable to be clogged because the through-apertures formed in the electrode 2 are closed at one end by the dielectric 4 and it is difficult to clean the through-apertures; the dielectric itself hinders the flow of ions to the recording member 6, making it necessary to provide a means to heighten the ion density.

SUMMARY OF THE INVENTION

The objective of this invention is to provide an ion modulating electrode which has overcome the above drawbacks and which is easy to manufacture and has high durability and high ion generation efficiency.

It has been found that the above objective can be achieved by an ion modulating electrode which comprises multiple layers consisting of a first conductive layer and a first dielectric layer, a second conductive layer and a second dielectric layer and a third conductive layer, stacked together in that order to form a multi-layer structure; through-apertures formed in this multi-layer structure; means to apply high-frequency voltage between the first conductive layer and the second conductive layer to produce ions in these apertures; means to apply voltage to the third conductive layer for enhancing the passage through the apertures of ions generated in these apertures by the first means; and a dielectric or semiconductive thin film coated on the first conductive layer or third conductive layer.

Other objectives and features of this invention will become apparent in the following description with reference to the attached drawing.

DESCRIPTION OF THE PREFERRED EMBODIMENTS

Figure 1:
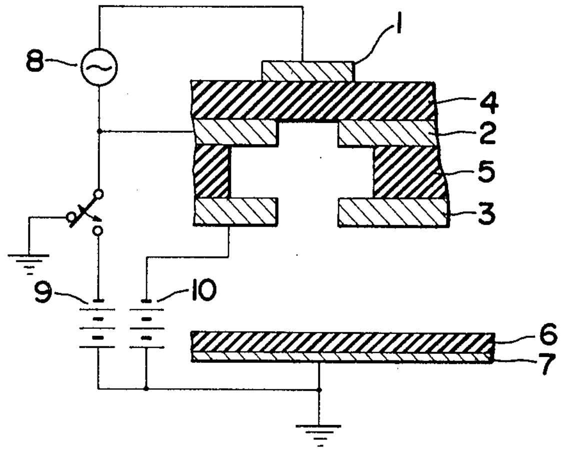
FIG. 1 PRIOR ART
FIG. 1 is a schematic view showing the construction of a conventional recording electrode.
Figure 2:
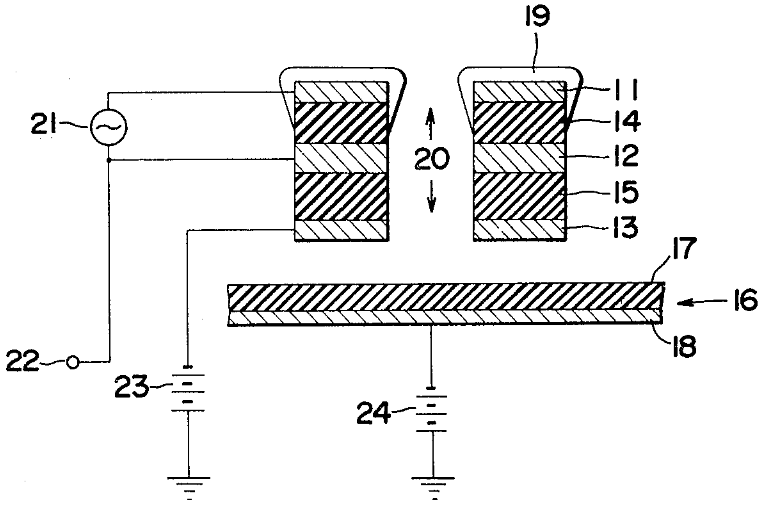
FIG. 2 is a schematic view showing the construction of the ion modulating electrode of this invention.

In FIG. 2, reference numerals 11, 12 and 13 are conductive layers which are usually made of copper plated with gold, nickel or rhodium to a thickness of 2–15 $\mu$. Designated 14 and 15 are dielectric layers which are usually made of heat-resisting, insulating macromolecule film 20–50 $\mu$ thick, such as polyimide film and polyimideamide film.

For the ion flow to be effectively applied onto the recording member or charge receptor, it is desirable that the electrodes and the dielectric layers be as thin as possible.

An electrostatic recording layer 16 consists of a dielectric charge receptor layer 17 and a conductive backing layer 18.

19 is a thin film covering the surface of the layer 11 and in this invention either dielectric or semiconductive film can be used. (It can therefore be said that the thin film 19 is of, at most limited conductivity, that phrase being used in a manner intended to encompass both dielectric or insulative and semiconductive films.) The material used for the dielectric thin film is a heat-resisting wire-coating agent such as polyimide, polyimide-amide or polysiloxane polymer. This coating agent is diluted with tetrahydrofuran or N-methyl-2-pyrrolidone and then sprayed onto the layer. The semiconductive film can be made by mixing carbon in the aforementioned dielectric material. These thin films will measure 5–15 $\mu$ in thickness when dried.

Designated 20 are apertures formed in the electrode which may be formed by etching or by using laser beams. The distance between the ion accelerating layer 13 and the electrostatic recording layer 16 is set at 200 $\mu$m. Reference numeral 21 denotes a power source for applying alternating current pulses of 1.5 kV and 500 kHz, 22 a terminal for applying a pulse voltage of $-250$ V between the layer 12 and the earth at an interval of 20 $\mu$ sec, and 23 an accelerating power source for applying a voltage of $-250$ V between the ion accelerating layer 13 and the earth. 24 is a power source for applying a voltage of $-650$ V between the backing layer 18 and the earth.

When AC voltage is applied between the layers 11 and 12 of the multi-layer electrode described above, a partial discharge takes place between the two electrodes through the dielectric layer 14, with the result that an electric field is established between the layers 12 and 13 by the potential of layer 12, causing only positive ions to move past the ion accelerating layer 13 to reach the electrostatic recording member 16. In this way, ions are made to attach to the electrostatic recording member 16 thus forming an electrostatic latent image.

The ion modulating electrode of this invention has the advantage of good durability and enables high-speed recording without clogging the electrode apertures.

As detailed above, since the ion modulating electrode of this invention has three layers and two dielectric layers stacked alternately and bonded together to form a multi-layer structure, and has openings cut through it with the uppermost layer of electrode coated with an insulating or semiconductive thin film, it is possible to control the current flowing in the electrode and prevent corrosion of the electrode and thereby improve its durability. This construction also enables easy manufacturing of the electrode and high-speed recording.

What is claimed is:

1. An improved multi-layer ion modulating electrode, comprising:

first and second conductive layers between which a high frequency voltage is operatively applied to generate an ion flow;

a first dielectric layer interposed between said first and second conductive layers;

a third conductive layer to which a control voltage is operatively applied for regulating the ion flow;

a second dielectric layer interposed between said second and third conductive layers;

said first, second and third conductive layers, and said first and second dielectric layers, being stacked together to form an integral electrode structure, and said integral structure further including a plurality of apertures defined through all of said layers of the electrode stack to delineate passages for the ion flow; and a thin film coating of, at most, limited conductivity over the entire exposed surface area of said first conductive electrode including those surface portions of the first conductive electrode disposed within said apertures.

2. An improved ion modulation electrode in accordance with claim 1, said thin film coating being of dielectric material.

3. An improved ion modulation electrode in accordance with claim 1, said thin film coating being semiconductive.

4. An improved ion modulation electrode in accordance with claim 3, said semiconductive thin film coating comprising a mixture of conductive and dielectric materials.

5. An improved ion modulation electrode in accordance with claim 4, said conductive material comprising a conductive carbon black.

6. An improved ion modulation electrode in accordance with claim 1, said thin film coating further extending within said apertures onto exposed surface portions of said first dielectric layer to thereby assure complete coverage by said film of the entire exposed surface area of said first conductive electrode.

* * * * *